Feb. 10, 1970    A. QUENOT    3,494,038
LINEAR MEASURING INSTRUMENTS WITH DIRECT READING
OF INTERNAL MEASUREMENTS
Filed Jan. 12, 1968
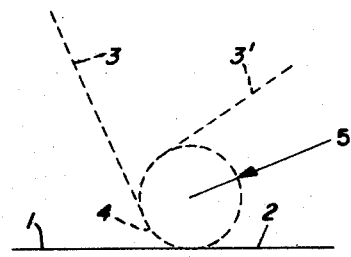
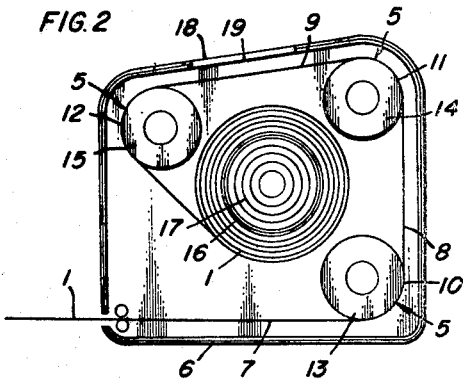
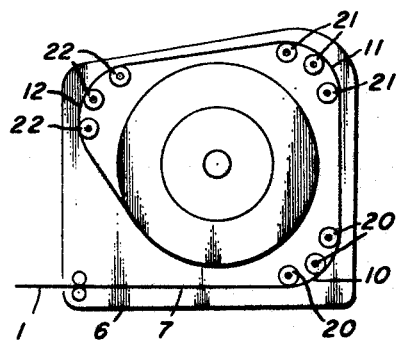
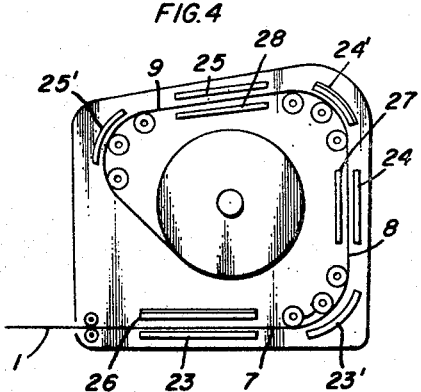
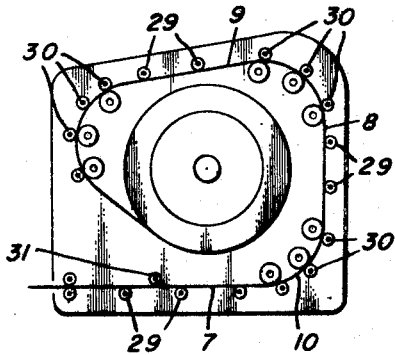
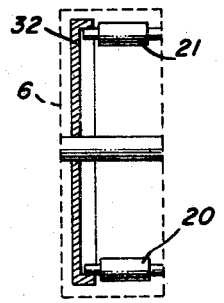
INVENTOR.
ANDRE QUENOT United States Patent Office 3,494,038
Patented Feb. 10, 1970

3,494,038
LINEAR MEASURING INSTRUMENTS WITH DIRECT READING OF INTERNAL MEASUREMENTS
André Quenot, Besancon, Doubs, France, assignor to Quenot & Cie S.a.r.l., Besancon, Doubs, France, a company
Filed Jan. 12, 1968, Ser. No. 697,441
Claims priority, application France, Nov. 10, 1967, 127,652
Int. Cl. G01b 3/02, 3/10
U.S. Cl. 33—138                        9 Claims

ABSTRACT OF THE DISCLOSURE

In this measuring instrument the inner path of the measuring tape has rectilinear and curvilinear portions whose radius of curvature is equal to the natural radius of curvature of the tape, the tape being guided by guiding members and optionally by safety members.

---

Linear measuring instruments with direct reading of inner measurements, that is with direct reading of the distance separating the extremity of the tape emergent from the rear face of the casing, comprise generally a window with a reading marker. The instrument comprises additionally guiding means ensuring guiding of the tape along a constant path from the inlet of the casing to the index arrow.

These guiding means associated with a path of constant length give rise to considerable friction on the tape, in particular in the extremely frequent case of metallic tapes. There results that the automatic return of the tape into the casing, for example under the urging of a spring, is rendered very difficult if the same is compared to that of instruments in which the tape winds immediately after its entry in the casing. Additionally, as planar travel portions were avoided in order to avoid excessively accentuated curvature, and in order to obtain a curved path of uniformly small curvature, friction occurred along the entire length of the path.

Efforts have been made to solve the problem by reinforcing the elastic return means which results in an increase in size of the instrument.

However use of these reinforced return means gives rise in practice to even greater friction on the tape additionally urged on the guiding means which cancel in the major part the increase in the return force despite the addition of ever more perfected guiding means such as rollers or free rolls or rolls driven by rotation of the drum.

Consequently, the invention proposes to make an improvement in linear measuring instruments with direct inside reading, which reduces friction of the tape along its guiding path to a strict minimum and which thereby permits easier re-entry and simplification in guiding means.

For this purpose the invention is concerned with an improvement in linear measuring instruments with directly read tape for inner measurements characterized in that the constant path travelled by the tape inside the casing is formed of one or several rectilinear portions and of one or several curvilinear portions whose radius of curvature is equal to the natural radius of curvature of the tape, said tape being guided along its constant path by guiding means and optionally by safety means.

The invention will be better understood by referring to the following description and to the accompanying drawing in which:

FIGURE 1 shows schematically the natural radius of curvature of the tape.

FIGURE 2 shows schematically a modification of the invention in which the curvilinear paths are guided by single rollers.

FIGURE 3 shows schematically a modification of the invention in which the curvilinear paths are guided by a series of rollers.

FIGURE 4 shows schematically a modification in which the parts of the rectilinear trajectories are disposed in front of inner and outer safety guides and the curvilinear parts in front of outer safety guides.

FIGURE 5 shows schematically a modification in which the constant path is provided with safety rollers.

FIGURE 6 shows in axial cross section an instrument with guiding rollers driven by the drum.

Reference is made to FIGURE 1.

Cross-sectionally curved tape 1 has, like all curved metallic tapes for linear measuring instruments, the property of not bending, at least when the efforts to which it is subjected are not too considerable.

When said tape 1 bends under the effect of its cantilevered weight or of some force, the two branches 2 and 3 formed by tape 1 meet along a nearly circular line 4 whose radius 5 is practically constant regardless of the angle formed by the two branches 2 and 3 (or 3′).

It is noted that it is impossible to freely give another curvature to tape 1 without restraining it by guiding means against which it necessarily reacts since in the free state it will again assume a curvature of radius 5.

Reference is made to FIGURE 2.

Tape 1 penetrates into casing 6 inside of which it follows first a constant path formed of rectilinear portions 7, 8 and 9 and curvilinear portions 10, 11 and 12. It is guided on said curvilinear portions 10, 11 and 12 by rollers or rolls 13, 14 and 15 all having the same radius 5.

After roller 15 tape 1 winds on drum 16 which itself can be stressed by a spring, either for return or of the compensating type 17. Rectilinear portion 9 passes in front of a window 18 made in casing 6 and which contains the index arrow for reading directly inside measurements 19.

It is seen that the invention permits to reduce friction to the strict minimum since rectilnear portions 7, 8 and 9 do not occasion any friction and the only forces which apply tape 1 against rollers 13, 14 and 15 are due to outside stresses (traction, spring 17) to the exclusion of all force due to bending of the tape.

Rollers 13, 14 and 15 make it possible to diminish very considerably the friction due to outside stresses of tape 1, but it is evident that they can be replaced by fixed guides such as ribs (not shown) of a radius equal to radius 5.

Reference is made to FIGURE 3.

In a modification and in order to obtain a smaller instrument, curvilinear portions 10, 11 and 12 can be guided by several rollers or rolls which are smaller than rollers 13, 14 and 15, for example, by rollers 20, 21 and 22.

Reference is made to FIGURE 4.

It can happen, but very accidentally, that the curvature of tape 1 momentarily tends to take place also outside curvilinear portions 10, 11 and 12, for example, on one of rectilinear portions 7, 8 or 9.

It suffices, to prevent it, to mount in front of these portions 7, 8 and 9 members such as guides or safety ribs 23, 24 and 25. These ribs 23, 24 and 25 do not play the role of ordinary ribs since they do not serve for guiding and are only occasionally in contact with tape 1. They are safety members.

It is also possible to dispose curvilinear ribs 23′, 24′ and 25′ in front of curvilinear portions 10, 11 and 12 to prevent a fortuitous displacement of tape 1 relative to rollers 13, 14, 15 or 20, 21, 22.

Safety ribs such as 23, 24, 25 can naturally owing to their occasional coming into play be made of any suitable matter which can even have a high coefficient of friction relative to tape 1. These rectilinear and/or curvilinear ribs can be made from the walls of the casing 6 itself regardless of the material of the walls.

There can be associated to these ribs such as 23, 24, 25 inner ribs 26, 27 and 28 which only play occasionally a safety role.

Reference is made to FIGURE 5.

In a modification, the rectilinear safety ribs such as 23, 24, 25 can be replaced by safety rollers or rolls such as 29 mounted on front of rectilinear portions 7, 8, 9. These rollers 29 only come into play occasionally and are normally not in contact with tape 1.

Similar rollers or rolls 30 can be placed in front of curvilinear portions 10, 11, 12. Similarly, safety rollers or rolls 31 can be mounted on the inner side of the rectilinear portions 7, 8, 9.

It goes without saying that safety rollers or rolls such as 29 or 30 or 31 can be associated to ribs such as 23, 24, 25 or 26, 27, 28 in any possible combination.

Reference is made to FIGURE 6.

As a modification, the guiding rollers or rolls such as 13, 14, 15 or 20, 21, 22 can be driven by the rotation of drum 16 instead of being free. This driving can be occasioned by a crown 32 integral with drum 16 and actuating rollers such as 20 or 21. It is also possible to drive the safety rollers or rolls.

In addition to the reduction in the friction permitting the automatic re-entry of the tape, the invention brings about a certain number of advantages as for example a reading on a rectilinear portion of the tape which avoids deformations due to the curvature of the tape under the window, especially when the window is a magnifying glass. Additionally a large part of the tape is visible through the window. Finally, the rectilinear trajectory of the tape in front of the window permits an excellent artificial lighting of the tape by eliminating shadowy zones resulting from curvature.

What is claimed is:

1. A tape measure comprising, a flexible elongated normally linear resilient tape having an arcuate transverse cross-section, said tape when bent about a transverse axis having an inherent radius of curvature determined by its transverse curvature and other physical characteristics, a rotatable drum on which said tape is windable and unwindable therefrom, guide means guiding travel of said tape longitudinally when winding said tape on said drum and unwinding it therefrom, said guide means constituting a plurality of members spaced relative to each other guiding said tape along a path in which said tape travels along a plurality of rectilinear portions and curvilinear portions during longitudinal travel of said tape, and said guide members defining on said path of travel curvilinear paths of travel defining on said tape curvilinear portions having a radius of curvature corresponding to said inherent radius of curvature.

2. A tape measure according to claim 1, in which said guide members comprise pivoted rollers.

3. A tape measure according to claim 2, in which said rollers comprise for each curvilinear portion a single roller, each roller having a radius corresponding to said selected radius of curvature.

4. A tape measure according to claim 2, in which said rollers comprise for each curvilinear portion a plurality of rollers defining jointly within each plurality said selected radius of curvature.

5. A tape measure according to claim 4, in which said rollers of each plurality of rollers are disposed on a common side of said tape.

6. A tape measure according to claim 5, including a casing for said drum, tape and guide members, and for each plurality of rollers a fixed rib on said casing disposed on a side of said tape opposite to said rollers defining the path of said curvilinear tape portions.

7. A tape measure according to claim 4, in which said rollers of each plurality of rollers comprises rollers on opposite sides of said tape.

8. A tape measure according to claim 4, including means rotatably driven from said drum and driving said rollers, and means driving said drum rotatably.

9. A tape measure according to claim 1 in which said tape is metallic.

References Cited
UNITED STATES PATENTS 3,281,943 11/1966 Maksim.
3,255,531 6/1966 Anderson.

LEONARD FORMAN, Primary Examiner

S. L. STEPHAN, Assistant Examiner

U.S. Cl. X.R.
242—84.8, 107